(12) United States Patent
Wright et al.

(10) Patent No.: US 11,488,120 B2
(45) Date of Patent: Nov. 1, 2022

(54) METHODS AND SYSTEMS FOR THE EFFICIENT TRANSFER OF ENTITIES ON A BLOCKCHAIN

(71) Applicant: nChain Holdings Limited, St. John's (AG)

(72) Inventors: Craig Steven Wright, London (GB); Stephane Savanah, London (GB)

(73) Assignee: nChain Holdings Limited, St. John's (AG)

( * ) Notice: Subject to any disclaimer, the term of this patent is extended or adjusted under 35 U.S.C. 154(b) by 1016 days.

(21) Appl. No.: 16/079,078

(22) PCT Filed: Feb. 16, 2017

(86) PCT No.: PCT/IB2017/050859
§ 371 (c)(1),
(2) Date: Aug. 22, 2018

(87) PCT Pub. No.: WO2017/145017
PCT Pub. Date: Aug. 31, 2017

(65) Prior Publication Data
US 2019/0066065 A1     Feb. 28, 2019

(30) Foreign Application Priority Data

Feb. 23, 2016 (GB) .................................. 1603123
Feb. 23, 2016 (GB) .................................. 1603125
Mar. 11, 2016 (GB) .................................. 1604244

(51) Int. Cl.
*G06Q 20/06* (2012.01)
*G06Q 20/38* (2012.01)
(Continued)

(52) U.S. Cl.
CPC .......... *G06Q 20/06* (2013.01); *G06F 16/1834* (2019.01); *G06F 16/27* (2019.01);
(Continued)

(58) Field of Classification Search
CPC .... G06Q 20/06; G06Q 20/223; G06Q 20/389; G06Q 30/08; G06Q 40/04; H04L 9/0643;
(Continued)

(56) References Cited

U.S. PATENT DOCUMENTS 5,873,071 A * 2/1999 Ferstenberg ........... G06Q 40/04
                                                            705/36 R
10,050,779 B2   8/2018 Alness et al.
(Continued)

FOREIGN PATENT DOCUMENTS

FR      3018379 A1    9/2015
WO    2015171580 A1   11/2015

OTHER PUBLICATIONS

Mülli, Alexander. A Decentralized Bitcoin Exchange with Bitsquare—Attack Scenarios and Countermeasures. Diss. Master's thesis, 2015.*
(Continued)

*Primary Examiner* — Steven S Kim
(74) *Attorney, Agent, or Firm* — Davis Wright Tremaine LLP

(57) ABSTRACT

The invention relates to blockchain technologies such as the Bitcoin ledger, and for the control and performance of secure, efficient exchanges conducted via the blockchain. It comprises tokenisation techniques and methods for embedding metadata in a blockchain transaction. It provides a computer implemented method for performing a transfer, the method comprising scanning entries in a distributed hash table (DHT) distributed across a first network, the DHT comprising a plurality of entries, each entry comprising an invitation to perform an exchange and a link to a transaction on a peer-to-peer (P2P) distributed ledger distributed across a second network, each invitation including metadata comprising an indication of entities to be exchanged and one or
(Continued)

more conditions for the exchange; determining a match between a first set of metadata in a first invitation of a first entry from a first user and a second set of metadata in a second invitation of a second entry from a second user, the determining comprising: identifying a match between indications of entities to be exchanged in the first and second invitations; and identifying a match between one or more of the conditions of the first invitation and one or more of the conditions of the second invitation; generating a first exchange transaction; and broadcasting, over the second network, the first exchange transaction for inclusion on a P2P distributed ledger, wherein the first exchange transaction comprises: an indication of a first quantity of a cryptocurrency to be transferred; a first input provided from an output of a transaction on the P2P distributed ledger linked to the first entry; a first script, a first user private key associated with the first user, a first third-party private key associated with a first third-party, wherein the first script comprises: the first set of metadata, a first user public key associated with the first user, the first user public key being a cryptographic pair with the first user private key, and a first third-party public key pair associated with the first third-party, the first third-party public key being a cryptographic pair with the first third-party private key and a first output indicating a transfer of a first quantity of the first entity from the first user to the second user.

37 Claims, 12 Drawing Sheets

(51) Int. Cl.
  *H04L 9/32* (2006.01)
  *G06Q 20/02* (2012.01)
  *G06F 16/27* (2019.01)
  *G06F 16/182* (2019.01)
  *H04L 9/06* (2006.01)
  *H04L 9/08* (2006.01)
  *H04L 67/104* (2022.01)
  *H04L 9/00* (2022.01)

(52) U.S. Cl.
  CPC ........... *G06Q 20/02* (2013.01); *G06Q 20/389* (2013.01); *G06Q 20/3829* (2013.01); *H04L 9/0643* (2013.01); *H04L 9/0825* (2013.01); *H04L 9/0861* (2013.01); *H04L 9/3247* (2013.01); *H04L 67/104* (2013.01); *G06Q 2220/00* (2013.01); *H04L 9/50* (2022.05); *H04L 2209/56* (2013.01)

(58) Field of Classification Search
  CPC ... H04L 9/0825; H04L 9/0861; H04L 9/3247; H04L 67/104; H04L 2209/38; H04L 2209/56; H04L 67/1097
  See application file for complete search history.

(56) References Cited

U.S. PATENT DOCUMENTS

| | | | | |
|---|---|---|---|---|
| 2002/0032633 A1* | 3/2002 | Okumura | ............... | G06Q 30/06 705/37 |
| 2003/0009417 A1* | 1/2003 | Pappas | ................. | G06Q 10/087 705/37 |
| 2004/0111358 A1* | 6/2004 | Lange | ............... | H01L 21/28061 705/37 |
| 2014/0136395 A1* | 5/2014 | Dowling | ................ | G06Q 40/04 705/37 |
| 2015/0026031 A1* | 1/2015 | Mullin, III | ............. | G06Q 40/04 705/37 |
| 2015/0066748 A1 | 3/2015 | Winslow et al. | | |
| 2015/0206106 A1 | 7/2015 | Yago | | |
| 2015/0324764 A1 | 11/2015 | Van Rooyen et al. | | |
| 2015/0363768 A1 | 12/2015 | Melika et al. | | |
| 2015/0363773 A1 | 12/2015 | Ronca et al. | | |
| 2016/0086175 A1 | 3/2016 | Finlow-Bates et al. | | |
| 2016/0092988 A1* | 3/2016 | Letourneau | .......... | G06Q 20/363 705/66 |
| 2016/0098723 A1 | 4/2016 | Feeney | | |
| 2017/0187535 A1* | 6/2017 | Middleton | ............ | H04L 9/3247 |
| 2017/0338963 A1* | 11/2017 | Berg | ..................... | H04L 9/3239 |
| 2019/0057362 A1* | 2/2019 | Wright | ................. | H04L 9/0643 |

OTHER PUBLICATIONS

Frey et al., ARM 2016: Proceedings of the 15th International Workshop on Adaptive and Reflective MiddlewareDec. 2016 Article No. 3pp. 1-6.*
Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.
Anonymous, "Counterparty (Technology)—Wikipedia," retrieved from https://en.wikipedia.org/w/index.php?title=Counterparty_(technology)&oldid=704763581, Feb. 13, 2016, 6 pages.
Antonopoulos, "Mastering Bitcoin—Unlocking Digital Cryptocurrencies," O'Reilly Media, Inc., Dec. 20, 2014, 282 pages.
Bishop, "Review of Bitcoin Scaling Proposals," retrieved from https://scalingbitcoin.org/montreal2015/presentations/Day1/2-Bryan-scalingbitcoin-review-latest, Sep. 12, 2015, 52 pages.
Bradbury, "Developers Battle Over Bitcoin Block Chain," Coindesk, http://www.coindesk.com/developers-battle-bitcoin-block-chain/, Mar. 25, 2014, 3 pages.
Extended European Search Report for Application No. 21153080.3, dated Jun. 30, 2021, 8 pages.
Franco, "Understanding Bitcoin: Cryptography, Engineering and Economics," Wiley, ISBN: 978-1-119-01916-9, Oct. 2014, 144 pages.
Grigg, "The Ricardian Contract," Proceedings First IEEE International Workshop on San Diego, Jul. 6, 2004, 11 pages.
Hearn, "Distributed markets," Bitcoin Wiki, https://en.bitcoin.it/wiki/Distributed_markets, Jul. 11, 2015 [retrieved Sep. 20, 2016], 5 pages.
International Search Report and Written Opinion dated Apr. 12, 2017, Patent Application No. PCT/IB2017/050859, 14 pages.
Nakamoto, "Bitcoin: A Peer-to-Peer Electronic Cash System," Bitcoin, Oct. 31, 2008, https://bitcoin.org/bitcoin.pdf, 9 pages.
OpenBazaar,"Blockchain Usage," retrieved from https://www.reddit.com/r/OpenBazaar/comments/2ur587/blockchain_usage/, Feb. 4, 2015, 3 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Sardesai, "Coinffeine: A P2P Alternative to Centralised Bitcoin Exchanges," CryptoCoinsNews, Feb. 3, 2014, 13 pages.
Satoshi et al., "Connection Limits," Bitcoin Forum, Aug. 9, 2010, https://bitcointalk.org/index.php?topic=741.0;prev_next=prev, 2 pages.
UK Commercial Search Report dated Jun. 7, 2016, Patent Application No. GB1604244.2, 8 pages.
UK IPO Search Report dated Dec. 14, 2016, Patent Application No. GB1604244.2, 6 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Wuille, "What Are the Keys used in The Blockchain LevelDB (ie What are the Key: Value Pairs)?—Bitcoin Stack Exchange," retrieved from https://bitcoin.stackexchange.com/questions/28168/what-are-the-keys-used-in-the-blockchain-leveldb-ie-what-are-the-keyvalue-pair, Jul. 10, 2014, 6 pages.

(56) References Cited

OTHER PUBLICATIONS

Zindris "Web-of-Trust.md? GitHub," Github, retrieved from https://gist.github.com/dionyziz/e3b296861175e0ebea4b, Aug. 8, 2014, 30 pages.
Zyskind et al., "Enigma: Decentralized Computation Platform with Guaranteed Privacy," arXiv preprint arXiv:1506, Jun. 10, 2015, 14 pages.

\* cited by examiner

ALICE

| Offer: | BTC |
|---|---|
| Request: | Token |
| Offer-type-code | $00002$ |
| Offer-QTY-max | NULL |
| Offer-QTY-min | NULL |
| Offer-item-ID | |
| Rate-min | $4.00000000 \times 10^{-5}$ shares/satoshi |
| Rate-max | NULL (no maximum - i.e. infinity) |
| Request-type-code | $0001_2$ |
| Request-item-ID | CAD1234 |
| Request-QTY-max | 10000 shares |
| Request-QTY-min | NULL (no minimum - i.e. 0) |
| Offer-Deadline | midnight 31-Dec-2016 |
| Explanation of the order | I will buy tokenised CAD for BTC up to $1000 at a rate of no less than $400/BTC. Deadline is midnight 31-Dec-2016 |

Fig. 4

BOB

| Offer: | TOKEN |
|---|---|
| Request: | BTC |
| Offer-type-code | $0001_2$ |
| Offer-QTY-max | 15000 shares |
| Offer-QTY-min | NULL (no minimum - i.e. 0) |
| Offer-item-ID | CAD1234 |
| Rate-min | $2.43902439 \times 10^2$ satoshis/share |
| Rate-max | NULL (no maximum) |
| Request-type-code | $0000_2$ |
| Request-item-ID | |
| Request-QTY-max | NULL |
| Request-QTY-min | NULL |
| Offer-Deadline | NULL |
| Explanation of the order | I will sell tokenised CAD up to $1500 at a rate of no more than $410/BTC |

Fig. 5

| Alice sends BTC to Bob | |
|---|---|
| ALICE00040 | Trancaction-ID |
| Version number | Version number |
| 1 | Number of inputs |
| ALICE00010 | Prev Trans Output |
| IDX-00 | Prev Trans Output index |
| Script length | Script length |
| Sig-Alice Sig-Escrowa < OP_2 metadataA metadataB metadataC metadataD metadataE PubK-Alice PubK-EscrowA OP_7 OP_CHECKMULTSIG> | ScriptSig |
| Sequence number | Sequence number |
| 3 | Number of outputs |
| 246,913,580 satoshi | Output value |
| Output script length | Output script length |
| OP_DUP OP_HASH160 <PubK-Bob hash> OP_EQUALVERIFY OP_CHECKSIG | Output script |
| 2,469,136 satoshi | Output value |
| Output script length | Output script length |
| OP_DUP OP_HASH160 <PubK-Server hash> OP_EQUALVERIFY OP_CHECKSIG | Output script |
| 3,116,284 satoshi | Output value |
| Output script length | Output script length |
| OP_DUP OP_HASH160 <PubK-Alice hash> OP_EQUALVERIFY OP_CHECKSIG | Output script |
| LockTime | LockTime |
| Bob sends token to Alice | |
| BOB00030 | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Fig. 7

| Alice sends BTC to Bob | |
|---|---|
| Transaction-ID | Trancaction-ID |
| Version number | Version number |
| 1 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| 3 | Prev Trans Output |
| 246,913,580 satoshi | Prev Trans Output index |
| Output script length | Script length |
| OP_DUP OP_HASH160 <redeem script hash> OP_EQUAL | ScriptSig |
| 2,469,136 satoshi | Sequence number |
| Output script length | Number of outputs |
| OP_DUP OP_HASH160 <PubK-Server hash> OP_EQUALVERIFY OP_CHECKSIG | Output value |
| 50,616,284 satoshi | Output script length |
| Output script length | Output script |
| OP_DUP OP_HASH160 <PubK-Alice hash> OP_EQUALVERIFY OP_CHECKSIG | Output value |
| LockTime | Output script length |

| Bob sends token to Alice | |
|---|---|
| Transaction-ID | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Fig. 9

| | |
|---|---|
| AB00010 | Trancaction-ID |
| Version number | Version number |
| 3 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 7 | Number of outputs |
| 246,913,580 satoshi | Output value |
| Output script length | Output script length |
| OP_DUP OP_HASH160 <PubK-Bob hash> OP_EQUALVERIFY OP_CHECKSIG | Output script |
| 2,469,136 satoshi | Output value |
| Output script length | Output script length |
| OP_DUP OP_HASH160 <PubK-Server hash> OP_EQUALVERIFY OP_CHECKSIG | Output script |
| 50,616,284 satoshi | Output value |
| Output script length | Output script length |
| OP_DUP OP_HASH160 <PubK-Alice hash> OP_EQUALVERIFY OP_CHECKSIG | Output script |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Fig. 10

| Alice sends token to Carol | |
|---|---|
| ALI00010 | Trancaction-ID |
| Version number | Version number |
| 2 | Number of inputs |
| ALI00010 | Prev Trans Output |
| IDX-00 | Prev Trans Output index |
| Script length | Script length |
| Sig-Ali Sig-Issuer < 2 metadata1 metadata2 PubK-Ali PubK-Issuer 4 OP_CHECKMULTSIG> | ScriptSig |
| Sequence number | Sequence number |
| ALI00010 | Prev Trans Output |
| IDX-01 | Prev Trans Output index |
| Script length | Script length |
| Sig-Ali PubK-Ali | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Alice pays Carol $1000 in tokenised CAD (expecting her GBP from Bob at a rate of AUD$2/GBP)
Alice pays herself the remainder of tokenised CAD (i.e. change) = $1500-$1000
Using regular (untokenised BTC) Alice pays the Service Provider's fee (say, flat rate = 10000 sat)
Using regular (untokenised BTC) Alice pays herself change from 900,000 leaving 1000 for miner

Fig. 11A

| Bob sends token to Alice | |
|---|---|
| BOB00030 | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Bob pays Alice GBP500 in tokenised GBP (expecting his AUD at a rate of $2/GBP)
Bob pays himself the remainder of tokenised GBP (i.e. change) = GBP750-GBP500
Using regular (untokenised BTC) Bob pays the Service Provider's fee (say, flat rate = 10000 sat)
Using regular (untokenised BTC) Bob pays himself change from 900,000 leaving 1000 for miner

Fig. 11B

| Carol sends token to Bob | |
|---|---|
| CAR00020 | Trancaction-ID |
| Version number | Version number |
| 2 | Number of inputs |
| CAR00010 | Prev Trans Output |
| IDX-00 | Prev Trans Output index |
| Script length | Script length |
| Sig-Car Sig-Issuer < 2 metadata1 metadata2 PubK-Car PubK-Issuer 4 OP_CHECKMULTSIG> | ScriptSig |
| Sequence number | Sequence number |
| CAR00010 | Prev Trans Output |
| IDX-01 | Prev Trans Output index |
| Script length | Script length |
| Sig-Car PubK-Car | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Carol pays Bob $1000 in tokenised AUD (expecting her CAD at a rate of $1CAD/AUD)
Carol pays herself the remainder of tokenised AUD (i.e. change) = $1500-$1000
Using regular (untokenised BTC) Carol pays the Service Provider's fee (say, flat rate = 10000 sat)
Using regular (untokenised BTC) Carol pays herself change from 900,000 leaving 1000 for miner

Fig. 11C

METHODS AND SYSTEMS FOR THE EFFICIENT TRANSFER OF ENTITIES ON A BLOCKCHAIN

The present invention relates to distributed, peer-to-peer ledgers and, in particular, blockchain technologies. The invention also relates in part to tokenisation and security techniques, and secure mechanisms for transferring entities and/or ownership of entities via a blockchain. It may comprise a method of performing secure transactions between different parties over a blockchain.

BACKGROUND & INTRODUCTION TO THE TECHNICAL AREA

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain. Tokenisation techniques can be used in respect of many different types of contexts where security, anonymity and cross-platform compliance are important. One such application area is financial applications, although the present invention is not limited to use in relation to financial transactions.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

SUMMARY

The invention is defined in the appended claims.

The present invention may provide solutions for the secure control and/or transfer or exchange of an asset via a blockchain. Herein, the term "entity" may be used interchangeably with "asset". Additionally or alternatively, the invention may enable control and/or transfer of ownership of the asset. This may be a digital or virtual asset such as a smart contract, or a real-world/physical asset. The asset may be a right such as a license or right to use or some sort of right relating to some type of property. The invention may use tokenisation techniques to facilitate this control or transfer. The invention may enable the transfer/exchange to be performed in a secure manner, incorporating the use of cryptographic keys, while not requiring any alteration of the underlying blockchain protocol. The invention may use techniques for embedding metadata in a script associated with a blockchain transaction (Tx).

The invention provides, not least: enhanced optimisation of memory usage for electronic transfers, improved security and data integrity through the use of hashing techniques, improved security through the removal of a need for a trusted third party, and enhanced anonymity of data. It may also provide improved communication mechanisms to enable disparate or distinct parties to identify each other and/or exchange data via the novel methods and/or architectures provided by the invention. This list of advantages is not limiting or exhaustive.

The invention may require the interaction and intercommunication of various distinct and separate computer-based resources, such as one or more user devices and a distributed computer system (blockchain) which includes computing nodes arranged to execute blockchain-related software and protocols.

The invention may provide a computer implemented method of performing an exchange of entities. The exchange may be made between a first user and a second user. It may be an exchange made over a computer network. The network may be a blockchain-implemented network. The term "user" may refer to a human user or a computer-based resource. The invention may provide an exchange control method for controlling the exchange of two or more entities. It may provide a tokenisation method for the exchange of digital entities. The invention may be described as a blockchain-implemented method.

The invention may provide a computer implemented method for performing a transfer or exchange. It may comprise the steps: scanning entries in a distributed hash table (DHT) distributed across a first network, the DHT comprising a plurality of entries, each entry comprising an invitation to perform an exchange and a link to a transaction on a peer-to-peer (P2P) distributed ledger distributed across a second network, each invitation including metadata comprising an indication of entities to be exchanged and one or more conditions for the exchange; determining a match between a first set of metadata in a first invitation of a first entry from a first user and a second set of metadata in a second invitation of a second entry from a second user, the determining comprising: identifying a match between indications of entities to be exchanged in the first and second invitations; and identifying a match between one or more of the conditions of the first invitation and one or more of the conditions of the second invitation; generating a first exchange transaction; and broadcasting, over the second network, the first exchange transaction for inclusion on a P2P distributed ledger, wherein the first exchange transaction comprises: an indication of a first quantity of a cryptocurrency to be transferred; a first input provided from an output of a transaction on the P2P distributed ledger linked to the first entry; a first script, a first user private key associated with the first user, a first third-party private key associated with a first third-party, wherein the first script comprises: the first set of metadata, a first user public key associated with the first user, the first user public key being a cryptographic pair with the first user private key, and a first third-party public key pair associated with the first third-party, the first third-party public key being a cryptographic pair with the first third-party private key and a first output indicating a transfer of a first quantity of the first entity from the first user to the second user.

Additionally or alternatively, the invention may comprise a method for performing a transfer or exchange wherein the hash of a script may be provided within, or associated with, a blockchain transaction (Tx). The script may be a redeem script. The transaction (Tx) may be a P2SH transaction in accordance with the Bitcoin protocol, or another functionally equivalent transaction type in another blockchain protocol. The hash of the script may serve as a look-up key to a hash table or other storage resource. This storage resource may be a public domain repository of invitations. The storage resource may comprise the look-up key (ie the hash) and all the fields from the metadata which, in combination, define the invitation. The look-up key may be a hash of the rest of the record i.e. a hash of concatenated metadata values. In a preferred embodiment, the metadata may comprise a pointer or other reference to the location of a contract associated with a token. The contract may be stored in a separate storage resource. The invitation (as defined by the metadata in the storage resource) may be linked to the blockchain transaction via the hash.

Preferably, the method further comprises generating a second exchange transaction; and broadcasting, over the second network, the second exchange transaction for inclusion on a P2P distributed ledger, wherein the second exchange transaction comprises: an indication of a second quantity of a cryptocurrency to be transferred; a second input provided from an output of a transaction on the P2P distributed ledger linked to the second entry, a second script, a second user private key associated with the second user, a second third-party private key associated with a second third-party, and a second output indicating a transfer of a second quantity of the second entity from the second user to a first user; wherein the second script comprises: the second set of metadata, a second user public key associated with the second user, the second user public key being a cryptographic pair with the second user private key, and a second third-party public key associated with the second third-party, the second third-party public key being a cryptographic pair with the second third-party private key a second output indicating a transfer of a second entity from the second user to the first user.

The invention may provide a computer implemented method for performing a transfer, the method comprising: scanning entries in a distributed hash table (DHT) distributed across a first network, the DHT comprising a plurality of entries, each entry comprising an invitation to perform an exchange and a link to a transaction on a peer-to-peer (P2P) distributed ledger distributed across a second network, each invitation including metadata comprising an indication of entities to be exchanged and one or more conditions for the exchange; determining a match between a first set of metadata in a first invitation of a first entry from a first user and a second set of metadata in a second invitation of a second entry from a second user, the determining comprising:

identifying a match between indications of entities to be exchanged in the first and second invitations; and identifying a match between one or more of the conditions of the first invitation and one or more of the conditions of the second invitation;

generating a first exchange transaction; and broadcasting, over the second network, the first exchange transaction for inclusion on a P2P distributed ledger, wherein the first exchange transaction comprises: an indication of a first quantity of a cryptocurrency to be transferred;

a first input provided from an output of a transaction on the P2P distributed ledger linked to the first entry; a first script, a first user private key associated with the first user, a first third-party private key associated with a first third-party, an indication of a second quantity of a cryptocurrency to be transferred; a second input provided from an output of a transaction on the P2P distributed ledger linked to the second entry, a second script, a second user private key associated with the second user, a second third-party private key associated with a second third-party, wherein the first script comprises: the first set of metadata, a first user public key associated with the first user, the first user public key being a cryptographic pair with the first user private key, and a first third-party public key pair associated with the first third-party, the first third-party public key being a cryptographic pair with the first third-party private key and a first output indicating a transfer of a first quantity of the first entity from the first user to the second user wherein the second script comprises: the second set of metadata, a second user public key associated with the second user, the second user public key being a cryptographic pair with the second user private key, and a second third-party public key associated with the second third-party, the second third-party public key being a cryptographic pair with the second third-party private key a second output indicating a transfer of a second quantity of the second entity from the second user to the first user.

In either of the first and second aspects, identifying a match between indications of entities to be exchanged in the first and second invitations may comprises: identifying a match between a requested entity in the first invitation and an offered entity in the second invitation; and identifying a match between an offered entity in the first invitation and a requested entity in the second invitation.

Advantageously, identifying a match between one or more of the conditions of the first invitation and one or more of the conditions of the second invitation comprises: identifying a first condition specifying a maximum value of the requested entity in the first invitation; identifying a second condition specifying a minimum value of the offered entity in the second invitation.

Preferably, identifying a match between one or more of the conditions of the first invitation and one or more of the conditions of the second invitation further comprises: determining that the maximum value is greater than the minimum value.

Advantageously, the first quantity of the first entity is determined based on one or both of the maximum value and the minimum value. Equally, the second quantity of the second entity may be determined based on one or both of the maximum value and the minimum value. The determination may be based on the mean of the maximum value and the minimum value.

The first quantity may be determined based on the maximum value and not the minimum value and the second quantity is determined based on the minimum value and not the maximum value.

In some embodiments, identifying a match between one or more of the conditions of the first invitation and one or more of the conditions of the second invitation further comprises: determining that a maximum value is less than but within a first threshold of the minimum value; and notifying the second user of the first invitation; receiving a confirmation of acceptance of the first condition from the second user; and identifying the match.

Preferably, identifying a match between one or more of the conditions of the first invitation and one or more of the conditions of the second invitation further comprises: determining that a minimum value is greater than but within a second threshold of the maximum value; and notifying the first user of the second invitation; receiving a confirmation of acceptance of the second condition from the first user; and identifying the match. Any of the above processes may be performed by a matching service provider.

The first third-party may be an escrow service provider and/or the second third-party is an escrow service provider.

In some embodiments, one or more of the first exchange transaction, the second exchange transaction, the first invitation transaction and the second invitation transaction is a pay-to-script-hash (P2SH) transaction.

In some embodiments, one or more of the entities is one of the following: a) bitcoin; b) a contract; c) goods; d) services. The contract may be for one or more of the following: a) fiat currency; b) title deeds; c) tickets; d) goods; e) services.

The first set of conditions and/or the second set of conditions may comprise one or more of the following: a) one or more range limits on one or more prices related to the exchange; b) an exchange rate; c) a deadline for fulfillment of the first invitation; d) a limitation on the geographical area for the exchange to take place.

The invention may provide a processor or group of processors operable to perform a method in accordance with the above.

Embodiment(s) of the invention may comprise a technique for embedding metadata in a (blockchain) transaction, comprising the steps of:
  generating a blockchain transaction (Tx) having an output (TxO) related to an asset (B1) and a hash of a redeem script which comprises:
    metadata comprising a token which is a representation of, or a reference to, a tokenised entity;
    and
    at least one (preferably two or more) public cryptographic keys.

The digital asset (B1) may be a quantity of cryptocurrency eg Bitcoin. The redeem script may be provided within a locking script of the transaction output TxO. The metadata may be provided in the redeem script at a location which is designated in a blockchain protocol as a location for a cryptographic key. This provides the advantage that the metadata can be transferred without the need for any alteration to the underlying blockchain protocol. Nodes operating the protocol will be agnostic to the use of the metadata in place of the cryptographic key.

The method may further include the step of submitting the transaction Tx to a blockchain. In effect, the cryptocurrency (B1) may thus be locked on the blockchain in association with the token. The quantity of cryptocurrency (B1) can only be spent (redeemed) upon provision of an unlocking script which meets the requirements of the locking script for the output TxO. In particular, a redeem script must be presented which, when hashed, matches the hash provided in the locking script of TxO. As the locking script for output TxO comprises the hash of the redeem script which in turn includes the token (in the metadata), the cryptocurrency (B1) is associated with the token. Upon presentation of the correct unlocking (redeem) script, ownership of the cryptocurrency (B1) may be transferred to the redeeming party or user i.e. it is spent.

The invention may provide a computer-implemented system arranged and configured to implement any method described above. Any feature(s) mentioned above in relation to one aspect or embodiment may be used in relation to any other embodiment or aspect. Any feature mentioned in relation to a method of the invention may apply equally to a corresponding, implanting system and vice versa.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present invention will now be described, by non-limiting example only, with reference to the accompanying drawings, in which:

FIG. 4 is a table illustrating a metadata format for an invitation generated by an exchange service provider;

FIG. 5 is a table illustrating a metadata format for an invitation generated by an exchange service provider;

FIG. 7 is a transaction table for a plurality of transactions between a plurality of parties to the system of FIG. 1;

FIG. 9 is a transaction table for a plurality of transactions between a plurality of parties to the system of FIG. 1;

FIG. 10 is a transaction table for a plurality of transactions between a plurality of parties to the system of FIG. 1;

FIG. 11A is a transaction table for a transaction between two parties to the system of FIG. 1;

FIG. 11B is a transaction table for a transaction between two parties to the system of FIG. 1; and FIG. 11C is a transaction table for a transaction between two parties to the system of FIG. 1.

DESCRIPTION OF EMBODIMENTS

Figure 1:
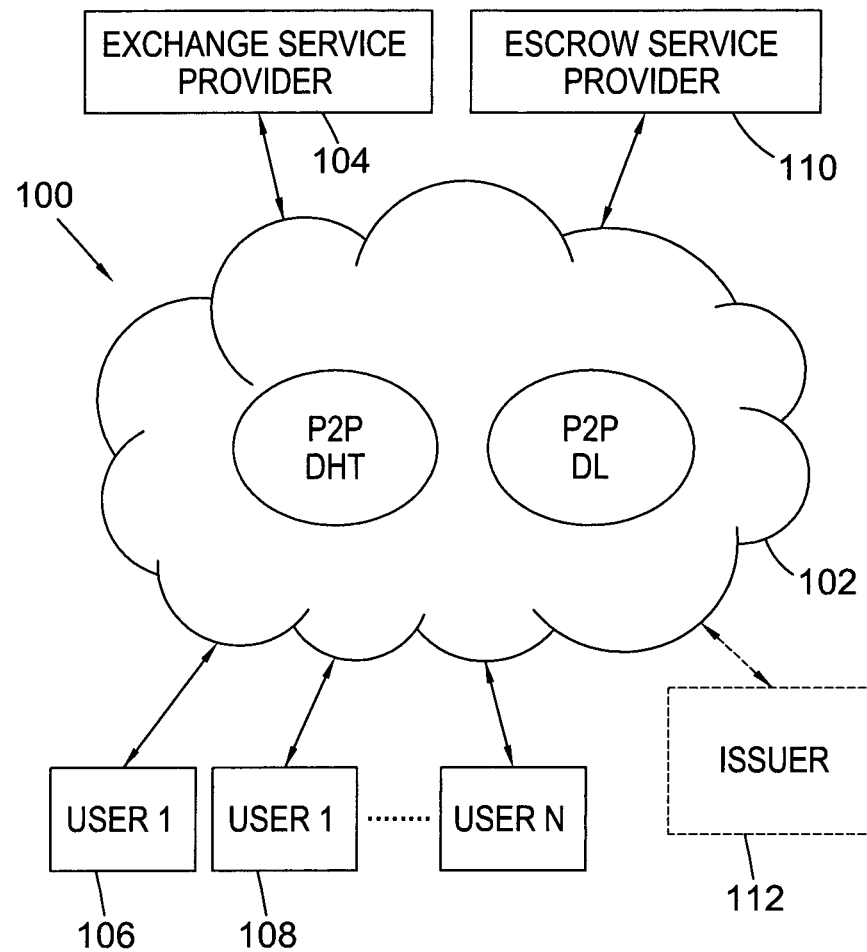
FIG. 1 is a schematic diagram of a system according to an embodiment of the present invention.

There exists a need for a quicker and cheaper way of performing and keeping a permanent record of day-to-day transactions, both financial and non-financial. It is important to note, that the invention is not limited to use with, or advantages for, financial applications. Instead, the present invention generally relates to methods and apparatus for utilising a P2P distributed ledger, such as the Bitcoin blockchain, to enable parties to offer, request and exchange any type of entity of value. Methods described herein enable the entry of an invitation (or order) to perform an exchange of entities as well as the enactment of the actual exchange on acceptance of an invitation. Embodiments therefore provide for a permanent record of all steps of an exchange process to be maintained. Further, each stage in the process (offer, acceptance and exchange) can be secured using cryptographic locking techniques similar to those used in transactions of cryptocurrencies. Methods described herein can also be used to exchange any type of entity. Examples of such entities include but are not limited to bitcoins, fiat currencies, contracts, goods and services. By "cryptocurrency" is meant an encrypted, electronically transferable digital asset such as, but not limited to, Bitcoin.

Exchanges such as Coinffeine (http://www.coinffeine.com/) which involve the use of blockchain technologies are known in the art. However, such prior art arrangements still rely on traditional models, and also rely on third-party sources, escrows, and other multi-currency non-bank accounts/processors in order to operate. These known arrangements achieve their decentralisation through their business models, rather than through technical innovations and cryptographic techniques (as per the present invention).

The present invention incorporates the use of tokenisation techniques. Contracts may be exchanged using the system by way of tokens. In summary, a token is an exchangeable entity which represents a contract. The contract may take one of several forms. For example, the contract may confer a right upon the holder or denote ownership of property. The value of the token may be contractually specified and is linked to the underlying BTC amount via a 'pegging rate'. The token is exchangeable via a novel type of transaction using a cryptocurrency protocol such as the bitcoin protocol. The bitcoin value on the transaction acts as a token representing a rights contract in digital form. The contract itself may be stored on the blockchain or may be kept in a publicly accessible off-block location, or may be held privately by the parties to the contract depending on the particular embodiment. Where the contract is not stored on the blockchain, a blockchain transaction (Tx) may store a unique pointer, identifier or other reference to the contract.

Tokens may be divisible. A divisible token is one in which the value on the transaction output can be subdivided into smaller amounts which can be allocated across multiple new tokens. Examples of divisible tokens include tokens for fiat currency or for shares in a race horse. Divisible contracts may be defined as those that specify a non-zero pegging rate. In other words, the token value is tied to the underlying bitcoin value. Alternatively, tokens may be non-divisible. A non-divisible token is a contract that specifies the holder's rights in terms of a fixed value, e.g. a contract to redeem a house or AU$1000. Non-divisible tokens are therefore not linked to the value of the underlying bitcoin. Being non-divisible, they can only be transferred as a whole.

Tokens may be digitally signed by a token issuer to be valid. The issuer may, for example be an authority such as a Registrar of Title deeds. The issuer may issue a token to a user in return for payment. That token may then give the user the right to exercise the contract linked to the token, whether the contract represents the right to redeem fiat currency or for a service to performed or for the transfer of property (i.e. a title deed).

Examples of tokens in accordance with the above, include the following:

A fiat currency token that is pegged to the BTC value of the transaction output by the issuer of the contract. For example "the spender of this token (bitcoin transaction) is entitled to redeem any fraction of this token for Canadian dollars (CAD) at a rate of 1 share (10 cents) for every 1000 satoshis".

A race horse owned by several members of a syndicate

Any item where the ownership is by a title deed, e.g., a house or other property could be treated in this way.

An electronic contract representing a concert ticket. This is inherently non-divisible.

A bearer bond (non-divisible)

A unique identifier attached to a Goods/service (such as a bar code or RFID). If used, this identifier is still preferably validated by a signature of an authorised entity; without a signature it will fall into the less secure 'goods/service' category (described below).

A contract for the right to a service to be performed. It is noted that this is not the same as the actual service itself, but only the right to have the service performed for them. This right can be traded. For example, a voucher from Michael's Mowing for up to 3 hours lawn mowing within the Sydney metropolitan area. The holder of this voucher (contract) can redeem it for the actual service.

Tokens must specify the value of a share, e.g., 1 share=10 cents CAD, 1 share=1 rupiah, or 1 share=1% ownership of an item or property (race horse, house, etc.).

Whilst embodiments described below may refer specifically to recording transactions on the Bitcoin blockchain (or simply the blockchain), it will be appreciated that the present invention may be implemented using any P2P distributed ledger. The blockchain is used below to describe aspects of the invention for simplicity only due to its high level of standardization and large quantity of associated public documentation.

As is well known in the art, the blockchain is a transaction ledger or database which is distributed across networked nodes participating in a system based on the Bitcoin protocol. A full copy of a currency's block chain contains every transaction ever executed in the currency. Thus, a continuously growing list of transactional data records is provided. Since each transaction entered onto the block chain is cryptographically enforced, the blockchain is hardened against tampering and revision, even by operators of the data store nodes.

Instead of or addition to being used in its designed function of storing a record of transactions representing payments of Bitcoins (or other cryptocurrency) from one party to another, the blockchain is used in a novel manner to enable a transfer of entities or assets between parties. The exchange transfers control and/or ownership of the digital entity from one party to another. In order to achieve this, the invention provides a mechanism for holding and recording invitations (or orders) to perform an exchange of one or more entities. The invention thus provides a novel and advantageous communication solution which is conducted via the blockchain.

As mentioned above, any type of entity or asset is exchangeable. These may be physical, "real world" entities, or virtual, digital entities. Examples of entities which may be exchanged include Bitcoins, tokens (representing any type of transferable contract), and goods and services of any type. Tokens may represent a contract conferring specified rights upon the holder to be redeemed for fiat currency (virtual banknotes), to denote ownership of property (e.g., title deeds), or grant access to an event (tickets), to name a few of many examples. Goods and services may include new or second hand products, labour (e.g., charged by the hour), complete jobs (e.g., mowing the lawn), to name a few of many examples.

FIG. 1 is a network diagram of a P2P exchange system 100 according to one embodiment. The system 100 comprises a network 102 and a plurality of parties to the network. The parties include an exchange service provider 104, a first user 106, a second user 108, an escrow service provider 110, and an issuer 112. As will be described in more detail below, a combination of functions of the exchange service provider 104, the escrow service provider 110 and the issuer 112, may be undertaken by a single party. In other words, a single party could simultaneously perform the functions of each. In addition, and as will be explained in more detail below, the exchange service provided 104 and escrow service provider 110 are optional, since the invention can be carried out entirely on the P2P exchange system without the use of those service providers 104, 110.

The exchange service provider 104 provides exchange services to a plurality of users, including the first user 106 and the second user 108. The issuer 112 is optional to the network 102, as denoted by broken lines. As will be discussed in more detail below, the issuer 112 is required only when exchange of tokens is involved.

In some embodiments, the network 102 is the internet. Accordingly, other parties (not shown) may be party to the network 102. All parties to the network 102 are able to communicate with all other parties to the network 102. Hosted on the network 102 are a peer-to-peer distributed hash table (P2P DHT) and a peer-to-peer distributed ledger (P2P DL). It will be appreciated that some or all of the parties shown in the system 100, together with those not shown, may act as host nodes to both or either of the P2P DHT and the P2P DL.

Structure of an Invitation

An invitation may be structured include various parameters or codes. These can be used for various purposes, eg matching invitations as described in more detail below. In one or more embodiments, the following structure may be used:

| | |
|---|---|
| Offer-type-code | |
| Offer-QTY-max | This is the amount of value e.g BTC that will be carried on the offerer's payment transaction. |
| | If the offerer is offering BTC than this value is simply the offerer's maximum BTC offer. |
| | If the offerer is offering tokenised currency then this value is the equivalent token value of the offerer's maximum offered currency amount (calculated based on the pegging rate specified on the tokenisation contract). The same is true if the offeror is offering a tokenised other commodity such as part ownership of a racehorse (the contract will still have a pegging rate that specifies the BTC token value for shares in the horse). |
| | If the offeror is offering a physical item then this field is ignored - but the actual bitcoin transaction will carry the minimum required amount (i.e. dust = 546 satoshis). |
| | Of course, the amount of the spend cannot exceed the total BTC value of the transaction's inputs so the offerer cannot offer more than the bitcoins owned. |
| Offer-QTY-min | |
| Offer-Item-ID | |
| Offer-Description | Keywords: This is a Condition that must be set if the Offer is goods/service and there is no other identifier (such as an auction site catalogue number) |
| Rate-min | This is the minimum rate of exchange that the offeror will accept expressed by convention as (requested units)/(offered units) |
| | Examples: |
| | (1) BTC offered for shares in a commodity (such as part ownership of a racehorse) |
| | rate = shares/satoshis |
| | (Note: this also applies to tokens that are non-divisible such as a concert ticket, although in this case there is only one share) |
| | (2) Token share offered for BTC |
| | rate = satoshis/share (e.g. satoshis/cent, where the tokens are for fiat amount such as CAD) |
| | (3) Token for token |
| | rate = requested-share/offered-share (e.g. cents/rupiah, where token offered represents rupiah and requested is CAD) |
| | Note that this is only a convention for the sake of consistency and convenience and will make matching easier. The rate could be just as easily be converted into requested-satoshis/offered-satoshis based on the pegging rate used on the tokenisation contract. |

-continued

| | |
|---|---|
| Rate-max | |
| Conditions | This will be a code to indicate up to 8 conditions that will be coded in separate metadata fields. For example:<br>Deadline (in Unix time)<br>Location<br>The format of these metadata fields depends on the type of condition.<br>Note that Offer-Description and Request-Description are also considered conditions. They are usually not needed as all the information required normally be can be coded into the other metadata fields. If they are needed then they need to be flagged as existing by switch on the appropriate flags in the Conditions bitfield. |
| Request-type-code | |
| Request-item-ID | |
| Request-description | Keywords: This is a Condition that must be set if the Request is goods/service and there is no other identifier (such as an auction site catalogue number) |
| Request-QTY-max | |
| Request-QTY-min | |

One purpose of the exchange service provider 104 is to provide a gateway for users 106, 108 to place invitations (or orders) on both the P2P DHT and the P2P DL. Whilst users 106, 108 of the network 102 may themselves place invitations on both the P2P DHT and the P2P DL, the exchange service provider 104 provides a simplified interface to improve the efficiency with which invitations are generated and to reduce the dangers associated with direct handling of transactions on a distributed ledger, such as the bitcoin ledger (e.g., losing transactions etc.) as the skilled person will appreciate. In addition to enabling the publishing of user invitations on the P2P DHT and P2P DL, the exchange service provider may perform one or more of the following additional services:

Matching invitations—As described above, an invitation may include a) details of the entities a user wishes to exchange, and b) one or more user applied options/conditions attached to the exchange. Two invitations may match when their respective entity details are mirrored and one or more of the conditions of the two invitations are compatible. In other words, a match may occur when one or more parameters or features included in a first invitation is/are also included in a second invitation and vice versa. There is a pairing or commonality between certain aspects of the invitations. These parameters may have been pre-designated as essential for a match in order for an exchange to be performed.

An example of mirrored entity details would be when a first user (Alice) offers bitcoins for apples and a second user (Bob) offers apples for bitcoins. The service provider may therefore provide a matching service to match compatible invitations in order to accommodate an exchange. Matching may involve scanning the P2P DHT for one or more invitations having matching entities and/or conditions. In some embodiments, the service provider 104 may scan the P2P DHT in response to a request from a user. For example, a user may provide to the service provider 104 one or more criteria for a desired invitation. Based on the criteria provided, the service provider 104 may then search for invitations already placed on the P2P DHT which match those criteria. In other embodiments, the service provider 104 may implement a non-specific pairing algorithm which searches the P2P DHT for matching or near-matching invitations which do not relate to a specific user request. It will be appreciated that matching services may be provided by other third-party providers. One or more third-party providers may exist, whose primary purpose is to provide matching services in accordance with the above as well as match alerts as described below. In some embodiments, matching is provided by a matching service provider (MSP).

In accordance with one or more embodiments, and with reference to the table shown in the "Structure of an Invitation" section above, a matching algorithm from matching invitations between A and B such as the following may be employed:

A's Offer-type-code must match B's Request-type-code

A's Request-type-code must match B's Offer-type-code

A's Rate-Min≤B's Rate-max (when expressed in equivalent units)

A's Rate-Max≥B's Rate-min (when expressed in equivalent units)

Request-item-ID must match Offer-item-ID

A's Request-QTY-min≤B's Offer-QTY-max

A's Request-QTY-max≥B's Offer-QTY-min

A's condition(s) (if any) must be compatible with B's invitation

B's condition(s) (if any) must be compatible with A's invitation

The invention may be arranged to incorporate machine-executable rules which enforce this algorithm or a variation thereof.

Match alerts—If a match or near-match is detected, the exchange service provider 104 may alert a user in a known manner, such as by email or via a phone or tablet app. Thus, the invention may provide a novel communication or alert mechanism.

Generating new invitations based on matches—Where a user provides details of an invitation or order he wishes to place, the service provider 104 may scan the P2P DHT for one or more invitations which satisfy the conditions of the user's order. If a matching invitation is then found on the P2P DHT, the service provider 104 may generate an invitation which mirrors the identified invitation already on the P2P DHT in order to facilitate a successful match. It is noted that in order to complete the final transaction on the P2P DL, all parties to a transaction must have an invitation already published on the P2P DL. However, not all invitations need be published on the P2P DHT. In the present example, for instance, the service provider need not publish the offer on the P2P DHT since there is no requirement for the invitation to be advertised (a desired match has already been found). It will be appreciated, however, that the generated invitation may still be placed on the P2P DHT, for example, in case the initial match falls through.

Executing transactions—After a pair of invitations have been successfully matched, the service provider 104 may act as a proxy to implement the final transaction. For example, on determination that two invitations match the service provider 104 may record an actual transaction, i.e. a transaction involving an exchange of entities, on the P2P distributed ledger. This process may be conducted automatically without the parties express authorisation or after prompting one or more of the parties to authorize the transaction. In some embodiments, metadata in an invitation may indicate whether or not a party must be notified before an exchange is finalised.

eWallet services—In addition to the above, the service provider 104 may also provide conventional eWallet services such as the holding of cryptocurrency keys etc.

A single service provider 104 is shown in the system 100 of FIG. 1. It will, however, be appreciated that one or more additional exchange service providers may be party to the network 102. Where more than one exchange service provider exists, users may choose an exchange service provider depending on their requirements, which may include, for example, the service provider's fee structure, location, compatibility etc. It will therefore be appreciated that, in certain circumstances, two users with matching invitations may be using different exchange service providers. In such circumstances, the users' respective exchange service providers may communicate between one another in order to facilitate an exchange.

In addition to the exchange service providers 104, an escrow service provider 110 (or escrow for short) may be party to the network 104. The escrow service provider 110 enables a user's offer to be held (i.e. the amount offered is reserved) until a transaction is settled, or under certain conditions to cancel an order and have returned anything that was offered in an invitation. The escrow service provider 110 acts as a neutral third party, trusted by two parties of a transaction, to provide an escrow service for transactions. Thus, the system allows users participating in a final transaction to have a guarantee that the user making an offer can fulfil the offered amount (in bitcoins or tokens).

As with exchange service providers, more than one escrow may be party to the network 104. Users of the P2P exchange system 100 may also choose which escrow provider they use, if and when they use one. In some embodiments, the services of the escrow 110 may be incorporated into those of the exchange service provider 104 or vice versa. In such case, a separate escrow may not be required.

In addition to the above, the system 100 may also comprise an issuer 112. An issuer 112 may be involved where the transaction involves the exchange of a token. In such circumstances, the process involves the issuer signing the token. Every transaction involving the transfer of a token preferably involves the issuer 112. In embodiments described herein, the issuer's signature is required in the invitation transaction, in which the token is offered and held in escrow. The issuer's signature may also be required in the exchange transaction, in which the payment of the token is made to the counterparty.

An important aspect of embodiments of the present disclosure is the ability to embed metadata concerning an invitation to perform an exchange in a bitcoin transaction (or other cryptocurrency transaction) as well as the ability to embed metadata concerning an actual exchange, in a bitcoin or other cryptocurrency transaction. Embodiments described herein use multi-signature pay to script hash (P2SH) type transactions to enable such metadata embedding as described below.

(i) Redeem Script in P2SH in General

As background, in a standard pay-to-script-hash method of the bitcoin protocol, the redeem script may take the form of:

<NumSigs PubK1 PubK2 . . . PubK15 NumKeys OP_CHECKMULTISIG> where

NumSigs—is the number "m" of valid signatures required to satisfy the redeem script to unlock the transaction PubK1, PubK2 . . . PubK15—are the public keys that correspond to signatures that unlock the transaction (up to a maximum of 15 public keys)

NumKeys—is the number "n" of public keys (which must be 15 or less)

To redeem the above redeem script, at least a number "m" of signatures corresponding to the public keys are required. In some examples, the order of the public keys is important and the number "m" out of "n" signatures for signing must be done in sequence. For example, say that "m" is two and the number of public keys "n" is fifteen. Say that two signatures are available for use, say Sig1 (corresponding to PubK1) and Sig 15 (corresponding to PubK15), the redeem script must be signed by Sig1 first followed by Sig15.

(ii) Embedding Metadata in a P2SH

The inventors have realised that metadata may be embedded in a P2SH in one or more of the 15 places available for the public keys in the redeem script.

For example, the P2SH may take the form of:

<NumSigs Metadata1 Metadata2 . . . PubK1 PubK2 . . . NumKeys OP_CHECKMULTISIG> where

NumSigs—is the number "m" of valid signatures required to satisfy the redeem script to unlock the transaction, Metadata1 and Metadata2—each include metadata that takes the place of a public key, PubK1 and PubK2—are actual public keys, and NumKeys—is the total number of positions taken by the metadata and the public keys (which must be 15 or less).

By placing, in a redeem script, metadata corresponding to conditions of an invitation, details of a contract associated with a token, and/or other information associated with an exchange, the hash of such information will be included in the P2P distributed ledger. This embedding method can be summarised as:

generating a blockchain transaction (Tx) having an output (TxO) related to a portion of cryptocurrency and a hash of a redeem script which comprises:

metadata comprising a token which is a representation of, or a reference to, a tokenised entity;

and at least one (preferably two or more) public cryptographic keys.

The tokenised entity could be a contract and/or other entity relating to the exchange. The metadata is provided in a location designated by the protocol for a cryptographic key.

Thus, the use of multi-signature P2SH bitcoin transactions in embodiments of the present invention offers several advantages. Firstly, they enable an invitation transaction to carry a metadata payload. Secondly, they facilitate the use of escrow services in an exchange transaction. Thirdly, where tokens are transferred in an exchange, they allow an exchange transaction to carry metadata associated with the one or more tokens being exchanged. Also, the underlying blockchain protocol is agnostic to the fact that metadata is being transmitted via the transaction. Therefore, no change is required to the blockchain protocol to convey this information.

Metadata may include a description or keyword describing an offer or request in an invitation transaction. Metadata may also include conditions associated with the invitation. For example, a deadline date may be attached to the invitation which may specify a time and/or date by which the order must be fulfilled. Where a deadline condition is provided with an invitation transaction, a cancellation transaction may be generated which spends the same BTC amount and contains a locktime representing the deadline for the exchange to take place. The cancellation transaction may be prevented from being distributed on the P2P DL until the locktime. If the exchange does not take place by the deadline, the cancellation transaction is added to the P2P DL and effectively pays back the payer and or service provider. If the exchange takes place before expiry of the deadline, the exchange transaction may spend the amount, creating a double-spend that hits the P2P DL ahead of the time-locked cancellation transaction, thereby blocking the cancellation transaction. In some embodiments, the metadata may not include a deadline, but instead the cancellation transaction can be solely responsible for cancelling the original invitation transaction. Alternatively, the deadline metadata condition may not automatically cause the spending of a cancellation transaction. In other words, the deadline may be a soft deadline which remains at the payer's control. This deadline may, therefore, be extended by a party simply allowing it to lapse and still accept late matching invitations. Equally, a service provider may still attempt to match off an expired order if it remains unspent.

Instead of locking in the cancellation transaction at the same time as placing the invitation transaction, a user may wait until after the deadline and manually enter the cancellation transaction if and when he so wishes.

Conditions may also include one or more location conditions which may specify, for example, that a transaction(s) is only broadcast onto the P2P DL if the location of the transactional broadcast is within X metres of specified coordinates. This ensures that the transaction can only take place at a specified location, for example, Bob's coffee shop.

A facility may exist that enables users to create their own new conditions and add them to the list of conditions by allocating them a previously unused condition-code. This facility may be resistant to abuse. For example, each service provider simply may make public their own table of conditions along with an associated condition-code and other parties to the system 100 can choose to adopt the same coding and may also add new ones of their own. Then if disputes arise due to, for example, re-use of condition code, the disputes may be resolved by the service provider or other users of the system 100.

Some examples of implementation of the present invention will now be described by way of example transactions between the first user 106 (referred to herein as Alice) and the second user (referred to herein as Bob). In this example the transaction is an exchange of tokenised Canadian dollars for bitcoin.

Posting an Invitation

Figure 2:
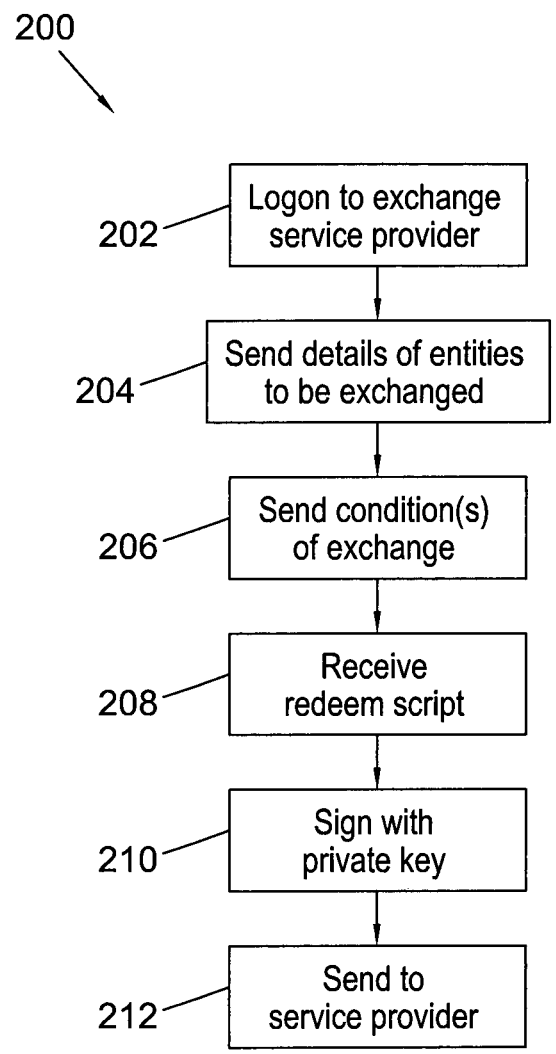
FIG. 2 is a flow diagram of a process performed by a user of the system of FIG. 1.

In a first example, Alice wants to buy some tokenised Canadian dollars (CAD) for bitcoin. To advertise her interest, Alice contacts her exchange service provider 104 through, for example, a web interface or via an app running on a tablet or cell phone. As shown in FIG. 2, at step 202, Alice logs into the service provider's 104 web interface. At steps 204 and 206, Alice then sends details of her invitation, including entities to be exchanged (tokenised CAD for bitcoin) and conditions of the exchange and any selected options offered by the service provider, to the service provider. Alice may input this information into an interface hosted by the service provider 104, for example using normal language which can then be translated by the service provider 104 into a valid invitation or, alternatively, Alice may simply enter the information by pre-selecting options, e.g., via drop-down selection menus.

At step 208, Alice receives from the service provider 104 a redeem script which has been generated by the service provider 104 based on her selections and includes information concerning the entities Alice wishes to exchange and any conditions associated with the invitation. Because Alice has signed up to use the particular service provider 104, the service provider 104 may already have Alice's public key. Alternatively, Alice may provide her public key to the service provider 104 either during the initial selection, or in response to a request from the service provider 104.

Alice signs the redeem script at step 210 using her private key, which is a cryptographic pair to her public key, and at step 212 sends the signed redeem script back to the service provider 104 to be distributed. This process may be supported with the use of an app, which may itself be provided by the service provider 104.

Figure 3:
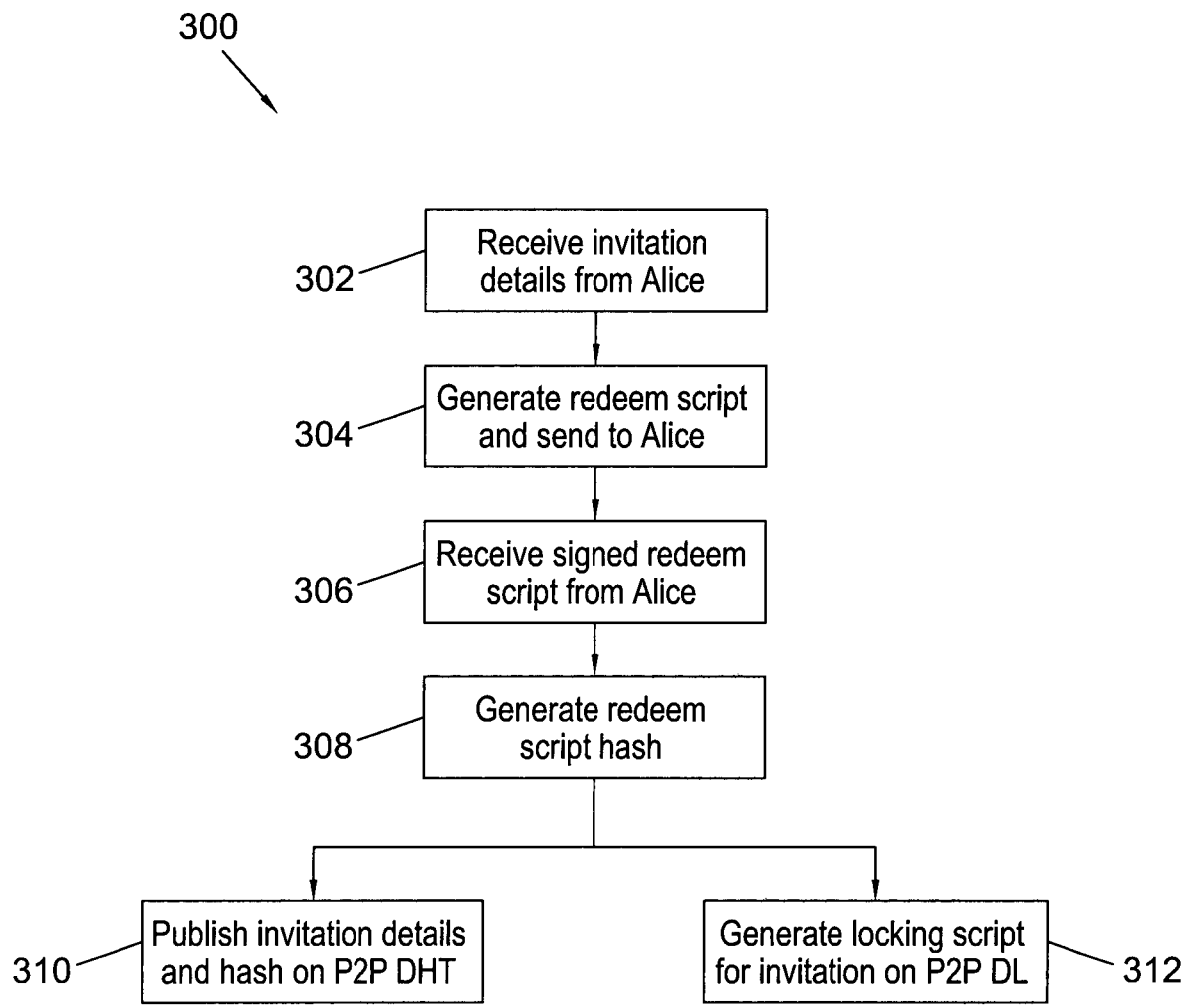
FIG. 3 is a flow diagram illustrating a process performed by an exchange service provider.

The flow diagram 300 shown in FIG. 3 illustrates the corresponding process performed by the service provider 104. At step 302, the service provider 204 receives the invitation details from Alice and generates a redeem script at step 304 using Alice's public key, the entity details and the conditions of the invitation. The redeem script may be in a format suitable for a P2SH bitcoin transaction; the invitation details may be stored in metadata fields in place of 32-byte public keys usually used in multisig unlocking scripts. FIG. 4 illustrates a format of the metadata for Alice's invitation, according to one embodiment. In the invitation, Alice requests tokenised CAD and offers bitcoins in return at a rate of no less than 400 CAD/bitcoin. As will be explained below in more detail, FIG. 4 also shows a deadline condition which may be added to the invitation. The deadline condition may cause the invitation to be revoked at the deadline in the event that an exchange has not been finalised based on the invitation.

The redeem script is then sent to Alice for signing. Upon receipt of a signed redeem script from Alice, at step 308 the service provider 104 generates a hash of the signed redeem script. In some embodiments, the service provider may keep a copy of Alice's private key (when authorised to do so). In which case, the redeem script may not physically be sent to Alice. Instead, Alice may be asked to confirm whether she wishes to proceed and, on receipt of authorisation from Alice, the service provider 104 may then sign the redeem script on Alice's behalf. Additionally or alternatively, Alice's private key may not be stored by the service provider 104, but instead recreated when needed and when authorised by Alice.

The service provider 104 uses the hash in two ways. Firstly, at step 310, the service provider 104 lists the invitation details along with the hash on the publicly available P2P DHT. As mentioned above, this table employs the torrent technique so it is distributed rather than centralised and hence it will remain publicly accessible and safe from adulteration. Other service providers 104 are then able to access the invitation and list it on their own site (indeed, the service provider 104 may simply use the hash table as the sole repository and need not even maintain its own local database of invitations.

The second way the hash is used is to create a locking script of a bitcoin transaction, at step 312. This transaction spends an amount of Alice's bitcoins to a P2SH script requiring 2 signatures to unlock: Alice's signature and that of her nominated escrow service provider 110 (which, as mentioned above, might or might not be the same entity as the service provider 104). The purpose of this transaction is twofold. Firstly, the invitation is logged on the P2P DL. Any user or their service provider can verify that the invitation on the P2P DHT is legitimate by ensuring that there exists a matching transaction on the P2P DL (via the matching hash values). Secondly, the transaction 'locks' the commitment made by Alice in her invitation; the amount of bitcoin Alice is offering in exchange for tokenised CAD is the amount spent by the order transaction. Thus, it can be verified that the order is backed by sufficient funds.

Pairing Matching Invitations

In a second example, Bob wants to sell some of his tokenised CAD for BTC and has independently listed his own invitation either using the same or a different service provider to the service provider 104 used by Alice. Bob's order, too, has been listed on the hash table and embedded in a P2P DL transaction as described with reference to FIGS. 2 and 3. The metadata of Bob's invitation is illustrated in FIG. 5.

Figure 6:
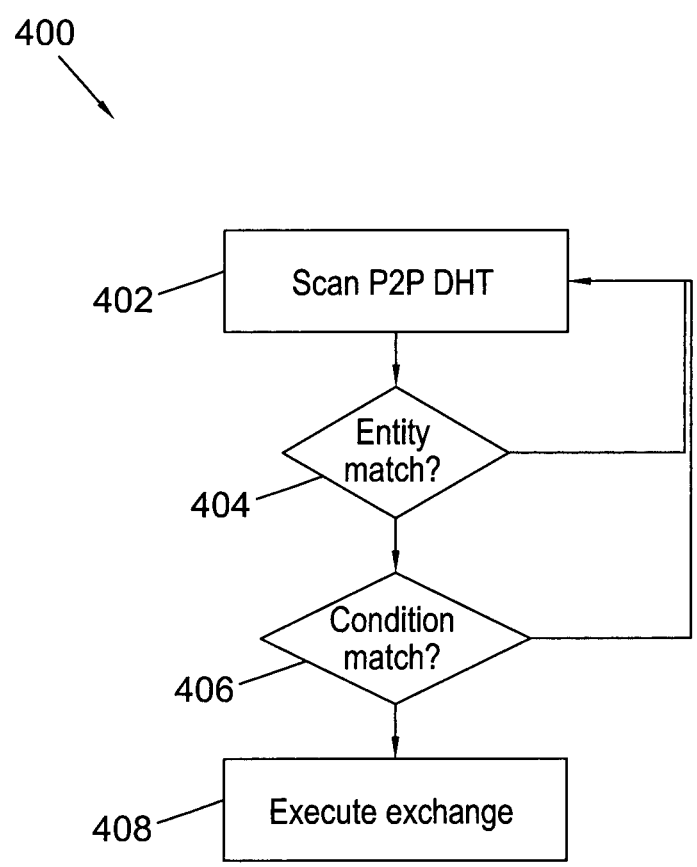
FIG. 6 is a flow diagram illustrating a process of matching invitations from two or more users of the system of FIG. 1.

Referring to FIG. 6, a process 400 of matching Alice and Bob's orders is described. In this example, the service provider 100 is described as performing the process. However, it will be appreciated that any exchange service provider or, indeed, any other suitable third-party may perform the process 400.

The exchange service provider 104 may run a matching algorithm operable to identify a full or partial match between Alice's and Bob's invitations. At step 402, the exchange service provider 104 scans the P2P DHT for matching entity details. During the scans, the service provider 104 checks for a match between the entity details of Alice's and Bob's invitations. If a match is not found at step 404, then the process returns to step 402 and the exchange service provider 104 continues to scan the P2P DHT for matching entity details. If a match is found at step 404, the process 400 continues to step 406 where a check is made for a match between one or more of the conditions of each of Alice and Bobs' invitations. If no match is found at step 406, the process returns to step 402. If a match between one or more conditions is found then the process moves to step 408 in which the exchange service provider 104 attempts to create and finalise a transaction between Alice and Bob.

A direct match of all conditions in the two invitations may not be required at step 406 for a positive match to be confirmed. Indeed, the process 400 may only require that some of the conditions match. Additionally or alternatively, one or more the conditions need not fully match. For example, if conditions being compared are exchange rates proposed in each condition, the process 400 may confirm a positive match provided the rates are within a predetermined threshold range of each other. For example, if Alice proposes a minimum rate condition of $4 \times 10^{-5}$ tokenised CAD/satoshi and Bob's equivalent maximum proposed rate is $3.9 \times 10^{-5}$ tokenised CAD/satoshi, the process may still confirm or propose a condition match even though Bob's offered rate doesn't quite satisfy Alice's original requirements. In such circumstances, upon match, Alice may be given an option to accept. It will be appreciated that if Bob's equivalent maximum proposed rate is $4.1 \times 10^{-5}$ tokenised CAD/satoshi, then the condition would be satisfied. In another example, the conditions might be respective values for goods and services proposed in an offer and request. The process 400 may again confirm a positive match provided the two values are within a predetermined threshold range of each other. In each case, the predetermined threshold range may be, for example, a discrete value or a percentage of the offer value or request value. In some embodiments, there may be a condition which can be set either to allow or disallow close matches, i.e. where there is not a direct match between Alice and Bob's respective offers. Equally, there may be a condition which can be set to either allow or disallow counteroffers which are not strictly within the offered range.

As stated previously, the transaction metadata for each or both of Bob and Alice's invitations may further comprise one or more location conditions which may specify, for example, that a transaction(s) is only broadcast onto the P2P DL if the location of the transactional broadcast is within X metres of specified coordinates. This ensures that the transaction can only take place at a specified location, for example, Bob's coffee shop.

Once a match is found, and before completing the transaction, one or more intervening steps may be performed. These may include an alert to the parties that a match has been found, followed by a request to each or both parties for confirmation that they wish to proceed, etc. For example, as discussed above, where a condition is nearly but not fully met by one or more users, a match may still be recorded but not finalised until all parties are happy with the conditions of the invitations. This process may lead to counter offers to negotiate a final agreement on conditions, which may then lead to the generation of further invitations in accordance with processes described above.

The final exchange may be executed by creating one or more bitcoin transactions that spend the outputs of each invitation transaction. The inventors have found several novel methods of completing the transaction, which may depend on circumstances including but not limited to: the users involved in the transaction, the entities being exchanged, and the service providers and issuers involved in the transactions. Some examples of these methods are described below.

Figure 8:
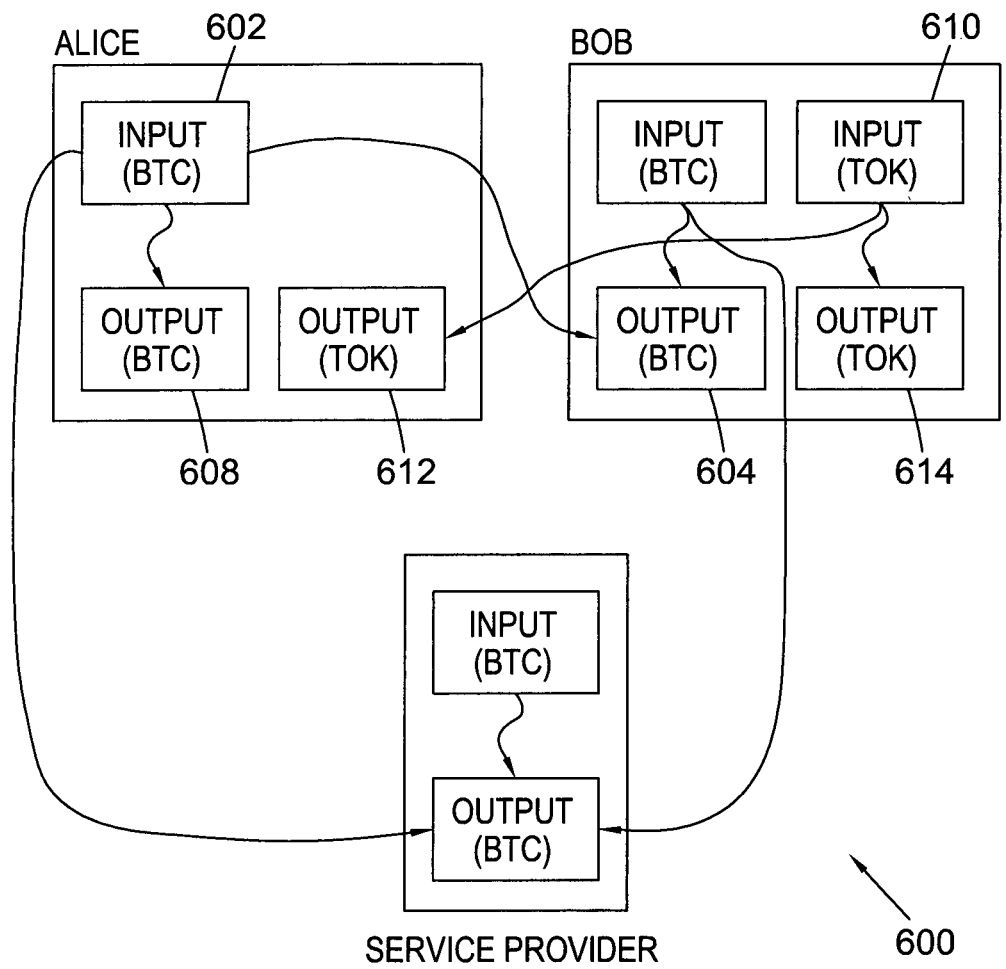
FIG. 8 is a transaction diagram illustrating transactions between parties to the system of FIG. 1.

Following on from the examples described above with reference to FIGS. 2 to 6, a transaction table 500 for the separate transactions for Alice-Bob and Bob-Alice is shown in FIG. 7 and a schematic diagram 600 of the transaction flow is shown in FIG. 8. As with the metadata values shown in FIGS. 4 and 5, values provided in the transaction table 500 are shown for example only. In this example, Alice's bitcoin in her invitation transaction are spent to Bob, and Bob's CAD-tokenised bitcoin in his invitation transaction are spent to Alice.

Referring first to the Alice-Bob transaction, the input 602 of this transaction is provided from the output of the invitation transaction which was placed on the P2P DL with Alice's invitation. Like the first transaction, the input script is signed by both Alice and the escrow service provider 110 (assuming Alice is happy for the transaction to proceed). The script unlocks the spent bitcoins which can then be output to a) Bob as his payment in return for the tokenised CAD (604), b) the exchange service provider 104 as payment for the exchange (606), and c) to Alice as change if any is due (608).

Referring now to the Bob-Alice transaction, this transaction has two inputs. The first input 610 of the transaction is provided from the output of the invitation transaction which was placed on the P2P DL with Bob's invitation. Because the input to this transaction is tokenised, the input script needs to be signed by both Bob and his token issuer. In this circumstance, the token issuer may also operate as an escrow, thereby withholding the funds until Bob (and optionally Alice) are satisfied with the transaction. The signed script unlocks the spent tokens which can then be output to a) Alice as payment in return for the BTC (612), and b) back to Bob as a change token to the value of the original token less the value sent to Alice (614). The second input 616 is from a previous bitcoin transaction of Bob's. This input is unlocked and output to a) the service provider 104 as payment for the exchange, b) the bitcoin miner as a fee for the exchange transaction and c) to Bob as change in bitcoin to the value of the original bitcoin input value less the service provider's 104 fee and the miner's fee.

The service provider's 104 fee for each transaction may be a slice of the value of the transaction. Alternatively or additionally, the fee may be a slice of the exchange rate spread between corresponding rate conditions presented in the two invitations. For example, where the offered rates overlap, the service provider 104 may fulfil both sides of the exchange at the asking rate of each and retain the difference as the fee. Alternatively or additionally, a flat fee (in satoshis, tokenised currencies or other) may be taken by the service provider 104. In some embodiments, the service provider might not extract a fee via the actual transactions. Instead, a user may be charged fees outside of the transaction. For example, a user may be charged a membership fee or a per transaction invoice for one or more transaction (per transaction or on account etc.).

Once the transaction has been completed, Bob and Alice's respective service providers may remove their invitation entries from the P2P DHT or enter a further entry which nullifies the original entry. For example, a service provider may simply leave the entry on the P2P DHT since the entry corresponds to a spend transaction, which implies that the invitation is no longer valid. Alternatively, a service provider may mark the transaction with a field that specifies that it has been spent. This may be a separate field on the DHT which corresponds to a particular entry but does not change the actual metadata associated with the invitation (this ensures that the script hash still matches the hash on the transaction). Alternatively, a service provider may delete the entry from the P2P DHT. However, a benefit of the P2P DHT is a permanent audit control for transaction using the system 100. Preferably, therefore, deletion of entries from the P2P DHT is prevented or deleted entries are archived so as to maintain a record of the entry. In one example, deleted entries are archived.

In the above example transaction, no puzzle is exchanged. In other words, the two transactions (Alice-Bob and Bob-Alice) are completely separate and discrete. It may be preferable in some cases, however, for the two transaction either to be valid or invalid. FIG. 9 shows an alternative transaction example in which a puzzle is exchanged in Alice's transaction (Alice-Bob). By doing so, the two transactions are locked together so that one cannot be spent without the other also being spent. This prevents a transaction going through from one party to another without the opposite transaction also going through. A 'puzzle' in this sense may comprise a hash of a secret that is only known by the other party. For example, the 'secret' may a number that is the 'solution' to the puzzle. The hash is integrated as part of the redeem script in such a way that, in order to unlock it, both signatures as well as the puzzle solution must be presented.

In the above two example, two bitcoin transactions are performed to complete the exchange. Where possible, however, it is preferable to consolidate the above two transactions into a single bitcoin transaction. Doing so automatically locks together the two parts of the exchange and leads to a reduction in the overall fees paid by Alice and Bob for the transaction.

FIG. 10 shows a transaction table 700 for the single transaction between Alice and Bob. The transaction flow for the exchange is the same as that of the previous two examples, i.e. as shown in FIG. 6. However, the exchange is consolidated into a single multi-input-multi-output (MIMO) transaction. As such, puzzles do not need to be swapped to ensure co-dependence as is the case where two separate transaction take place. It is noted that in FIG. 8, two separate fees are paid to the exchange service provider 104. However, if the exchange service provider 104 is the same for both Bob and Alice, these two fees may be consolidated into a single transaction, paid by Bob, Alice or both Bob and Alice.

Transactions Involving More than Two Parties

Transactions described above have been in relation to exchanges between two entities. It will, however, be appreciated that in some examples more than two entities may be involved in an exchange. Consider, for example, the following scenario. Alice wishes to exchange bitcoins for apples, but will only accept a minimum of 1000 apples. Bob wants to exchange apples for bitcoins, but can only supply 500 apples. Carol wants to exchange apples for bitcoins but can only supply 600 apples. In such a circumstance, the conditions of Alice's invitation cannot be satisfied by Bob or Carol individually. Together, however, Bob and Carol have 1100 apples and so can satisfy Alice's invitation conditions.

In another example, Alice wishes to exchange tokenised CAD for tokenised GBP, Bob wishes to exchange tokenised GBP for tokenised AUD, and Carol wishes to exchange tokenised AUD for tokenised CAD. No direct match exists between any two of the three parties, but combined, each of the invitations can be satisfied—Alice's tokenised CAD can go to Carol, Bob's tokenised GBP can go to Alice, and Carol's tokenised AUD can go to Bob. FIGS. 11A to 11C show exemplary transaction tables for transaction between Alice, Bob and Carol.

Referring first to FIG. 11A, a transaction table is shown for the payment from Alice to Carol. Alice has $1500 of tokenised CAD and needs tokenised GBP500 from Bob. The transaction pays tokenised CAD1000 to Carol from Alice and Alice pays herself the remaining tokenised CAD500 (1500-1000). Using regular BTC, Alice may pay the service provider's fee (which may be a flat fee as is shown in FIG. 11A or a fee dependent on the value of the transfer) and pays herself the change minus 1000 satoshis for the miner.

Referring now to FIG. 11B, a transaction table is shown for the payment of tokenised GBP to Alice from Bob. Bob has tokenised GBP750 and needs tokenised AUD from Carol. The transaction pays tokenised GBP500 to Alice from Bob and Bob payers himself the remaining tokenised GBP250 (750-500). Using regular BTC, Bob may pay the service provider's fee (which may be a flat fee as is shown in FIG. 11B or a fee dependent on the value of the transfer) and pays himself the change minus 1000 satoshis for the miner.

Referring now to FIG. 11C, a transaction table is shown for the payment of tokenised AUD to Carol from Bob. Carol has tokenised AUD1500 and needs tokenised CAD from Alice. The transaction pays tokenised AUD1000 to Bob from Carol and Carol payers herself the remaining tokenised AUD500 (1500-1000). Using regular BTC, Carol may pay the service provider's fee (which may be a flat fee as is shown in FIG. 11C or a fee dependent on the value of the transfer) and pays herself the change minus 1000 satoshis for the minor. It will be appreciated that where an exchange is composed of two or more separate transactions (e.g. 1: Alice transfers to Bob; and 2: Bob transfers to Alice), the transactions may be linked so as to ensure that either every party receives their entitlement or none of them do. This may be achieved by satisfying the following condition (using an example of two parties, A and B, but easily extendable to three or more parties): The transaction output transferring from A to B exists and is spendable by B only if the transaction output transferring from B to A also exists and is spendable by A at the same time, and vice versa. It is note that party A and party B refer to the required set of signatories for each transaction, not just Alice and Bob (for example, it may include token Issuers, escrow, etc.).

Receiving a Selection from a User

In a variation of the example exchange described above with reference to FIG. 6, instead of a service provider parsing the P2P DHT for matching orders, users themselves may scan or browse the P2P DHT to view the current invitations. Browsing may be facilitated by a third-party, such as the exchange service provider 104. The third-party may provide an interface within which users can browse, scan and search for invitations which they might be interested in.

Users may then skip the process of entering their own prospective invitation on the P2P DHT, but instead choose to create an invitation which matches or nearly matches the order which they're interested in.

For example, carrying on from but in contrast to the previous example, Bob may find Alice's invitation on the P2P DHT via a browsing or searching interface. In which case Bob may enter his own invitation to match that of Alice's. Bob may do this in one of several ways. In one example, there may be a facility on the interface which displays Alice's order to 'Accept' her order. If Bob is a client of the same exchange service provider 104 as that which Alice used for the invitation, they may already have access to Bob's eWallet (public key etc.) and can thus create the matching order based on such information. Accordingly, the exchange service provider 110 may generate a redeem script for the matching invitation, send this to Bob for signing, receive the signed redeem script and enter the order onto the P2P DL in preparation for the transaction. If Bob is not a client of Alice's exchange service provider 104, a facility may be provided to allow Bob to enter the required information and authorisations that can then enable the Service provider to create Bob's matching order. The same process as that described above with reference to FIGS. 7 and 8 may then follow.

The above example describes the exchange of BTC for tokenised CAD. However, it will be appreciated that the system 100 works for any type of exchange including, for example, BTC for token of any type (i.e. representing any contract, not just for currency contracts), token of any type for token of any other type, BTC for goods/services, tokens for goods/services, or goods/services for goods/services. Additionally and theoretically, the above process can be modified to exchange of BTC for BTC, although such an exchange has no real meaning.

Exchanging Goods/Services

A slight variation of the above described transaction process is required when goods/services are involved in the exchange.

In such a case, the transaction (of the goods and/or services) comprises a description of the goods or services involved in the exchange. Unlike a token, which is represented by a contract or title deed, the description does not form a contract.

The description may or may not uniquely identify the item. For example, where a physical item is involved in the transaction, the description may refer explicitly to a unique identifier associated with that physical item. Additionally or alternatively, description metadata may include one or more of the following: a) a general description of a desired item offered or requested, e.g., "dishwasher, <3 yo", b) reference to a specific item for sale on an auction website, e.g., "second hand product put up for sale on an auction site", c) any number of an item type, e.g., advertise 15 t-shirts for sale that can be bought as singles or any quantity up to 15, d) reference to cash, in any specified currency, e) description of labour and payment per single job completion or for regular lawn mowing (repeating job) with payment per repetition or hour, or f) one or more keywords, e.g. "dishwasher".

As regards services, services may be backed by a contract as with a token. As such, a service may be divisible into shares, and non-divisible services may be considered as one-time jobs, i.e. divisible but comprising a single share (1 share). If the service is non-divisible, it may be treated as a token for the purposes of invitation and exchange. Where an item is backed by a token it is treated as a token for the purposes of both invitation and exchange and is exchanged in the same manner as other tokens, such as tokens for fiat currency.

An example of a transaction involving a physical item associated with a unique identifier will now be described. Similar to previous examples, in the present example, Alice has used her exchange provider to place an invitation on the P2P DL and P2P DHT. The invitation includes a description that she will buy a physical item having unique identifier XYZ123, which may relate to Rafael's masterpiece Deposition of Christ, for no more than 2500 BTC. Equally, Bob may have placed a matching invitation that he will sell item XYZ123 for no less than 2400 BTC. Alice may have browsed the P2P DL and found the item with item number XYZ123 and placed a matching order based on this information or, alternatively, Alice may have placed a generic invitation which was then matched by a third party, e.g., an exchange service provider, and subsequently a new invitation including the catalogue item number and description was made to match Bob's order.

For transactions involving unique IDs, it will be appreciated that such IDs must be unique not only to a particular exchange service provider, but also across the entire P2P DL, forever. Therefore, if the unique identifier is not totally unique to the device (e.g. the devices serial number) then the exchange service provider may generate a unique identifier for the device. To ensure that each identifier is unique to the entire P2P DL, each exchange service provider may, for example, have their own unique code prefixed to numbers they use to uniquely identify products being advertised on the P2P DL.

Once an agreement has been reached between Alice and Bob, the transactions take place in accordance with the example transactions processes described above with reference to FIGS. 7 to 10.

A further example of a transaction involving a physical item will now be described. In this example, however, the item does not have a unique identifier associated therewith.

Where an invitation includes an offer to sell a plurality of similar items, metadata may be required to describe the maximum and minimum quantity of items which can be bought with any one transaction. For example, Alice may place invitation inferring that she will sell up to 15 Dead Lizard 2015 concert tour t-shirts for 0.025 BTC each—at least 5 per transaction. In this case, metadata values may include a minimum rate (0.025 BTC/items); a maximum quantity (Offer-QTY-max (15)) and a minimum quantity (Offer-QTY-min (5)). The table below summarises the metadata associated with the invitation.

| Field | Sub-field | Value | Comments |
|---|---|---|---|
| A | ContractType | 0x0000FF01 | Indicates P2P Exchange Order |
|   | ContractPointer |  | IPv6 address of the actual contract file location |
|   | OfferRequestCodes |  | Coded value indicating Offer-type (4 bits) + Request-type (4 bits) |
|   | Conditions | $00000011_2$ | Bitfield - flags indicating the presence of extra conditions in metadata fields |
|   | Rate-min | 0.025 | BTC/item |
|   | Rate-max |  |  |
| C | Offer-QTY-max | 15 | Maximum quantity of t-shirts per sale |
|   | Offer-QTY-min | 5 | Minimum quantity of t-shirts per sale |
|   | Request-QTY-max |  |  |
|   | Request-QTY-min |  |  |
| D | Offer-Item-ID | 01245D2SA | Unique ID related to item |
|   | Request-item-ID |  |  |

The actual BTC value on the payment transaction will then be calculated by an exchange service provider. Because this transaction simply represents an invitation to perform and exchange, the actual value of the transaction may be small, e.g. as small as dust (546 satoshis). Alternatively, as described below, the value may be a nominal amount required by a service provider to guarantee an invitation (e.g. so Alice is incentivised not to pull out).

In a further example, goods in the form of hard currency (cash) may be exchanged. For example, Alice may place an invitation to sell bitcoin for Canadian dollars (hard currency instead of tokenised) with a maximum purchase of 150 BTC. The invitation may additionally include a location condition that the exchange must take place at her shop address only: 371 Whimsy Avenue, Brentford. After placing a matching invitation, in order to finalise the transaction, Bob may then bring the cash to Alice's shop to hand over in exchange for a payment in bitcoin transaction. The actual digital transaction of bitcoin to Bob and of the digital record of transfer of hard cash to Alice, may then take place once Bob and Alice have met in her shop for the physical transfer.

In the case of a transaction involving goods/services swapped for other goods/service, it will be appreciated that the transaction on the P2P DL exists as a record only and not for exchanging any value between parties (apart from any fees to service providers etc.). Users may use the system and opt to pay the nominal service fee for entry of the transaction onto the P2P DL so that the exchange is permanently recorded.

It is noted that the original invitation transactions act as invitations only and not as value transfer or as records of events. If a goods-for-goods exchange occurs, such that the exchange involves physical items only, the final exchange need not be recorded on the P2P DL, since the P2P DL is not required to complete any transactions in the final exchange.

Notwithstanding, if parties to the exchange of physical items wish to record the exchange on the P2P DL, they may each spend their invitation transactions to one another subject to a fee for the miner for doing so. If the parties do not wish to record the final exchange on the P2P DL, they may each spend their invitation transactions back to themselves, or even leave them unspent on the P2P DL.

In the case of an exchange involving BTC for goods, or tokens for goods, at least one transaction is spent on the P2P DL to transfer the value of the BTC or token. In this case, the invitation transaction offering up the goods may or may not be spent since the value of the exchange (goods) is not transferred by spending that invitation transaction. However, again, parties may decide to spend the transaction nonetheless, in order to provide a permanent record of the transfer (e.g., a receipt of sale).

The amount spent on the above transactions might not represent the offered amount in some cases, particularly when Alice's offer is not bitcoin or tokens but goods/service. Instead, the Service Provider might require a 'deposit' by Alice of an amount representing the value of the goods, or might only require a nominal amount if Alice is able to 'guarantee' the offer in another way, or might itself provide the bitcoins on Alice's behalf (she might not have any) and cover this funding cost by whatever means they charge a fee to the client.

In embodiments described above, users' invitations are published on a P2P DHT. In some embodiments, however, a user's invitation (e.g. the script and script hash) may be published on a website, sent directly to another user.

In some embodiments, a user's invitation may be stored locally by a service provider. For example, the service provider may host a private auction in which only certain users can access the user's invitation details.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The steps, features, integers, compositions and/or compounds disclosed herein or indicated in the specification of this application individually or collectively, and any and all combinations of two or more of said steps or features.

The invention claimed is:

1. A computer-implemented method for performing an exchange of entities, the computer-implemented method comprising:
   scanning entries in a distributed hash table (DHT) distributed across a first network, the DHT comprising a plurality of entries, each entry comprising an invitation to perform an exchange and a hash identifying a transaction having the hash on a peer-to-peer (P2P) distributed ledger distributed across a second network, each invitation including metadata comprising an indication of the entities to be exchanged and one or more conditions for the exchange;
   determining, by executing machine-readable rules, a match in the DHT between a first set of metadata in a first invitation of a first entry from a first user and a second set of metadata in a second invitation of a second entry from a second user, the determining comprising:
      identifying a first match between indications of entities to be exchanged in the first and second invitations; and identifying a second match between the one or more conditions of the first invitation and the one or more conditions of the second invitation;
responsive to determining the match, determining a first hash of the first set of metadata;
identifying a first output of a first transaction having the first hash in the P2P distributed ledger;
generating a first exchange transaction, wherein the first exchange transaction comprises:
 an indication of a first quantity of a cryptocurrency to be transferred;
 a first input provided from the first output of the first transaction;
 a first redeem script, wherein the first redeem script comprises:
  the first set of metadata;
  a first user public key associated with the first user, the first user public key being a cryptographic pair with a first user private key;
  a third-party public key pair associated with a third-party, the third-party public key being a cryptographic pair with a third-party private key; and
  the first output indicating a transfer of a first quantity of the first entity from the first user to the second user;
 the first user private key associated with the first user; and
 the third-party private key associated with the third-party; and
causing the first exchange transaction to be written to the P2P distributed ledger by broadcasting the first exchange transaction over the second network.

2. The computer-implemented method of claim 1, further comprising:
responsive to determining the match, determining a second hash of the second set of metadata;
identifying a second output of a second transaction having the second hash in the P2P distributed ledger;
generating a second exchange transaction, wherein the second exchange transaction comprises:
 an indication of a second quantity of a cryptocurrency to be transferred;
 a second input provided from the second output of the second transaction;
 a second redeem script, wherein the second redeem script comprises:
  the second set of metadata;
  a second user public key associated with the second user, the second user public key being a cryptographic pair with a second user private key;
  the third-party public key pair associated with the third-party, the third-party public key being a cryptographic pair with the third-party private key; and
  the second output indicating a transfer of a second quantity of the second entity from the second user to the first user;
 the second user private key associated with the second user; and
 the third-party private key associated with the third-party; and
causing the second exchange transaction to be written to the P2P distributed ledger by broadcasting the second exchange transaction over the second network.

3. The computer-implemented method of claim 2, wherein identifying the first match between indications of entities to be exchanged in the first and second invitations comprises:
identifying a third match between a requested entity in the first invitation and an offered entity in the second invitation; and
identifying a fourth match between an offered entity in the first invitation and a requested entity in the second invitation.

4. The computer-implemented method of claim 3, wherein identifying the second match between the one or more conditions of the first invitation and the one or more conditions of the second invitation comprises:
identifying a first condition specifying a maximum value of the requested entity in the first invitation; and
identifying a second condition specifying a minimum value of the offered entity in the second invitation.

5. The computer-implemented method of claim 4, wherein identifying the second match between the one or more conditions of the first invitation and the one or more conditions of the second invitation further comprises:
determining that the maximum value is greater than the minimum value.

6. The computer-implemented method of claim 4, wherein the first quantity of the first entity is determined based on one or both of the maximum value and the minimum value.

7. The computer-implemented method of claim 4, wherein the second quantity of the second entity is determined based on one or both of the maximum value and the minimum value.

8. The computer-implemented method of claim 4, wherein the first quantity of the first entity is determined based on the mean of the maximum value and the minimum value.

9. The computer-implemented method of claim 4, wherein the first quantity of the first entity is determined based on the maximum value and not the minimum value and the second quantity of the second entity is determined based on the minimum value and not the maximum value.

10. The computer-implemented method of claim 4, wherein identifying the second match between the one or more conditions of the first invitation and the one or more conditions of the second invitation further comprises:
determining that the maximum value is less than but within a first threshold of the minimum value;
notifying the second user of the first invitation;
receiving a confirmation of acceptance of the first condition from the second user; and
identifying the second match.

11. The computer-implemented method of claim 4, wherein identifying the second match between the one or more conditions of the first invitation and the one or more conditions of the second invitation further comprises:
determining that the minimum value is greater than but within a second threshold of the maximum value;
notifying the first user of the second invitation;
receiving a confirmation of acceptance of the second condition from the first user; and
identifying the second match.

12. The computer-implemented method of claim 2, wherein the third-party is an escrow service provider.

13. The computer-implemented method of claim 2, wherein one or more of the first exchange transaction and the second exchange transaction is a pay-to-script-hash (P2SH) transaction.

14. The computer-implemented method of claim 1, wherein the computer-implemented method is performed by a matching service provider.

15. The computer-implemented method of claim 1, wherein one or more of the entities is one of the following:
   a) bitcoin;
   b) a contract;
   c) goods; or
   d) services.

16. The computer-implemented method of claim 15, wherein the contract is for one or more of the following:
   a) fiat currency;
   b) title deeds;
   c) tickets;
   d) goods; and/or
   e) services.

17. The computer-implemented method of claim 1, wherein the one or more conditions comprise one or more of the following:
   a) one or more range limits on one or more prices related to the exchange;
   b) an exchange rate;
   c) a deadline for fulfilment of the first invitation; and/or
   d) a limitation on the geographical area for the exchange to take place.

18. The computer-implemented method of claim 1, wherein the first set of metadata is provided in the first redeem script and/or the second set of metadata is provided in the second redeem script at a location which is designated in a blockchain protocol as a location for a cryptographic key.

19. A processor or group of processors executing instructions, wherein execution of the instructions causes a computer-implemented system to:
   scan entries in a distributed hash table (DHT) distributed across a first network, the DHT comprising a plurality of entries, each entry comprising an invitation to perform an exchange and a hash identifying a transaction having the hash on a peer-to-peer (P2P) distributed ledger distributed across a second network, each invitation including metadata comprising an indication of the entities to be exchanged and one or more conditions for the exchange;
   determine, by executing machine-readable rules, a match in the DHT between a first set of metadata in a first invitation of a first entry from a first user and a second set of metadata in a second invitation of a second entry from a second user, wherein to determine the match, execution of the instructions further causes the computer-implemented system to:
      identify a first match between indications of entities to be exchanged in the first and second invitations; and
      identify a second match between the one or more conditions of the first invitation and the one or more conditions of the second invitation;
   responsive to determining the match, determine a first hash of the first set of metadata;
   identify a first output of a first transaction having the first hash in the P2P distributed ledger;
   generate a first exchange transaction, wherein the first exchange transaction comprises:
      an indication of a first quantity of a cryptocurrency to be transferred;
      a first input provided from the first output of the first transaction;
      a first user private key associated with the first user;
      a third-party private key associated with a third-party; and
      a first redeem script, wherein the first redeem script comprises:
         the first set of metadata;
         a first user public key associated with the first user, the first user public key being a cryptographic pair with the first user private key;
         a third-party public key pair associated with the third-party, the third-party public key being a cryptographic pair with the third-party private key; and
         the first output indicating a transfer of a first quantity of the first entity from the first user to the second user; and
   cause the first exchange transaction to be written to the P2P distributed ledger by broadcasting the first exchange transaction over the second network.

20. A computer-implemented method for performing an exchange of entities, the computer-implemented method comprising:
   scanning entries in a distributed hash table (DHT) distributed across a first network, the DHT comprising a plurality of entries, each entry comprising an invitation to perform an exchange and a hash identifying a transaction having the hash on a peer-to-peer (P2P) distributed ledger distributed across a second network, each invitation including metadata comprising an indication of the entities to be exchanged and one or more conditions for the exchange;
   determining, by executing machine-readable rules, a match in the DHT between a first set of metadata in a first invitation of a first entry from a first user and a second set of metadata in a second invitation of a second entry from a second user, the determining comprising:
      identifying a first match between indications of entities to be exchanged in the first and second invitations; and
      identifying a second match between the one or more conditions of the first invitation and the one or more conditions of the second invitation;
   responsive to determining the match, determining a first hash of the first set of metadata and a second hash of the second set of metadata;
   identifying a first output of a first transaction having the first hash in the P2P distributed ledger and a second output of a second transaction having the second hash in the P2P distributed ledger;
   generating a first exchange transaction; and
   causing the first exchange transaction to be written to the P2P distributed ledger by broadcasting the first exchange transaction over the second network,
   wherein the first exchange transaction comprises:
      an indication of a first quantity of a cryptocurrency to be transferred;
      a first input provided from the first output of the first transaction;
      a first redeem script;
      a first user private key associated with the first user;
      a first third-party private key associated with a first third-party;
      an indication of a second quantity of a cryptocurrency to be transferred;

a second input provided from the second output of the second transaction;
a second redeem script;
a second user private key associated with the second user; and
a second third-party private key associated with a second third-party,
wherein the first redeem script comprises:
the first set of metadata;
a first user public key associated with the first user, the first user public key being a cryptographic pair with the first user private key;
a first third-party public key pair associated with the first third-party, the first third-party public key being a cryptographic pair with the first third-party private key;
and
the first output indicating a transfer of a first quantity of the first entity from the first user to the second user, and
wherein the second redeem script comprises:
the second set of metadata;
a second user public key associated with the second user, the second user public key being a cryptographic pair with the second user private key;
a second third-party public key associated with the second third-party, the second third-party public key being a cryptographic pair with the second third-party private key; and
the second output indicating a transfer of a second quantity of the second entity from the second user to the first user.

21. The computer-implemented method of claim 20, wherein identifying the first match between indications of entities to be exchanged in the first and second invitations comprises:
identifying a third match between a requested entity in the first invitation and an offered entity in the second invitation; and
identifying a fourth match between an offered entity in the first invitation and a requested entity in the second invitation.

22. The computer-implemented method of claim 21, wherein identifying the second match between the one or more conditions of the first invitation and the one or more conditions of the second invitation comprises:
identifying a first condition specifying a maximum value of the requested entity in the first invitation; and
identifying a second condition specifying a minimum value of the offered entity in the second invitation.

23. The computer-implemented method of claim 22, wherein identifying the second match between the one or more conditions of the first invitation and the one or more conditions of the second invitation further comprises:
determining that the maximum value is greater than the minimum value.

24. The computer-implemented method of claim 23, wherein the first quantity of the first entry is determined based on one or both of the maximum value and the minimum value.

25. The computer-implemented method of claim 24, wherein the second quantity of the second entry is determined based on one or both of the maximum value and the minimum value.

26. The computer-implemented method of claim 25, wherein the first quantity is determined based on the maximum value and not the minimum value and the second quantity is determined based on the minimum value and not the maximum value.

27. The computer-implemented method of claim 24, wherein the first quantity of the first entry is determined based on the mean of the maximum value and the minimum value.

28. The computer-implemented method of claim 22, wherein identifying the second match between the one or more conditions of the first invitation and the one or more conditions of the second invitation further comprises:
determining that the maximum value is less than but within a first threshold of the minimum value;
notifying the second user of the first invitation;
receiving a confirmation of acceptance of the first condition from the second user; and
identifying the second match.

29. The computer-implemented method of claim 22, wherein identifying the second match between the one or more conditions of the first invitation and the one or more conditions of the second invitation further comprises:
determining that the minimum value is greater than but within a second threshold of the maximum value;
notifying the first user of the second invitation;
receiving a confirmation of acceptance of the second condition from the first user; and
identifying the second match.

30. The computer-implemented method of claim 20, wherein the computer-implemented method is performed by a matching service provider.

31. The computer-implemented method of claim 20, wherein the first third-party is an escrow service provider and/or the second third-party is an escrow service provider.

32. The computer-implemented method of claim 20, wherein the first exchange transaction is a pay-to-script-hash (P2SH) transaction.

33. The computer-implemented method of claim 20, wherein one or more of the entities is one of the following:
a) bitcoin;
b) a contract;
c) goods; and/or
d) services.

34. The computer-implemented method of claim 33, wherein the contract is for one or more of the following:
a) fiat currency;
b) title deeds;
c) tickets;
d) goods; and/or
e) services.

35. The computer-implemented method of claim 20, wherein the one or more conditions comprise one or more of the following:
a) one or more range limits on one or more prices related to the exchange;
b) an exchange rate;
c) a deadline for fulfilment of the first invitation; and
d) a limitation on the geographical area for the exchange to take place.

36. The computer-implemented method of claim 20, wherein the first set of metadata is provided in the first redeem script and/or the second set of metadata is provided in the second redeem script at a location which is designated in a blockchain protocol as a location for a cryptographic key.

37. A processor or group of processors executing instructions, wherein execution of the instructions causes a computer-implemented system to:
- scan entries in a distributed hash table (DHT) distributed across a first network, the DHT comprising a plurality of entries, each entry comprising an invitation to perform an exchange and a hash identifying a transaction having the hash on a peer-to-peer (P2P) distributed ledger distributed across a second network, each invitation including metadata comprising an indication of the entities to be exchanged and one or more conditions for the exchange;
- determine, by executing machine-readable rules, a match in the DHT between a first set of metadata in a first invitation of a first entry from a first user and a second set of metadata in a second invitation of a second entry from a second user, wherein to determine the match, execution of the instructions further causes the computer-implemented system to:
  - identify a first match between indications of entities to be exchanged in the first and second invitations; and
  - identify a second match between the one or more conditions of the first invitation and the one or more conditions of the second invitation;
- responsive to determining the match, determine a first hash of the first set of metadata and a second hash of the second set of metadata;
- identify a first output of a first transaction having the first hash in the P2P distributed ledger and a second output of a second transaction having the second hash in the P2P distributed ledger;
- generate a first exchange transaction; and
- cause the first exchange transaction to be written to the P2P distributed ledger by broadcasting the first exchange transaction over the second network, wherein the first exchange transaction comprises:
- an indication of a first quantity of a cryptocurrency to be transferred;
- a first input provided from the first output of the first transaction;
- a first redeem script;
- a first user private key associated with the first user;
- a first third-party private key associated with a first third-party;
- an indication of a second quantity of a cryptocurrency to be transferred;
- a second input provided from the second output of the second transaction;
- a second redeem script;
- a second user private key associated with the second user; and
- a second third-party private key associated with a second third-party, wherein the first redeem script comprises:
- the first set of metadata;
- a first user public key associated with the first user, the first user public key being a cryptographic pair with the first user private key;
- a first third-party public key pair associated with the first third-party, the first third-party public key being a cryptographic pair with the first third-party private key;

and
- the first output indicating a transfer of a first quantity of the first entity from the first user to the second user, and wherein the second redeem script comprises:
- the second set of metadata;
- a second user public key associated with the second user, the second user public key being a cryptographic pair with the second user private key;
- a second third-party public key associated with the second third-party, the second third-party public key being a cryptographic pair with the second third-party private key; and
- the second output indicating a transfer of a second quantity of the second entity from the second user to the first user.

* * * * *